United States Patent [19]
Gordon

[11] Patent Number: 4,578,683
[45] Date of Patent: Mar. 25, 1986

[54] GRAPHIC RECORDING SYSTEM

[75] Inventor: James F. Gordon, Saratoga, Calif.

[73] Assignee: Nicolet Instrument Corporation, Madison, Wis.

[21] Appl. No.: 792,176

[22] Filed: Oct. 28, 1985

Related U.S. Application Data

[63] Continuation of Ser. No. 514,625, Jul. 18, 1983, abandoned.

[51] Int. Cl.[4] .................. G01D 9/28; G01D 15/24
[52] U.S. Cl. .......................... 346/49; 346/139 R
[58] Field of Search ............... 346/139 R, 49 R, 29, 346/46, 139 A, 139 B, 139 C, 141

[56] References Cited

U.S. PATENT DOCUMENTS

| | | | |
|---|---|---|---|
| 2,778,710 | 1/1957 | Komas | 346/46 |
| 3,145,070 | 8/1964 | Miller | 346/29 |
| 3,550,276 | 12/1970 | Kramer | 346/29 |
| 4,405,931 | 9/1983 | Fujisawa | 346/49 |

Primary Examiner—E. A. Goldberg
Assistant Examiner—Mark Reinhart
Attorney, Agent, or Firm—Kinney & Lange

[57] ABSTRACT

A graphic recording system wherein a plurality of recording elements are carried by a carriage, the carriage being movable in two directions along a path relative to a recording medium. An actuator selectively actuates the recording elements by mechanical engagement for recording on the medium. A rod having a longitudinal axis that is generally parallel to the path is supported, independently of the carriage, for rotation about its axis. An actuator arm is carried by the rod for rotation with the rod while being movable along the rod axis. Detents selectively interlock the actuator and carriage in predetermined relative positions. In a preferred embodiment, the detents are formed of slots within the carriage in predetermined relationships with the recording elements and a key rotatable with the actuator arm into and out of the slots.

10 Claims, 4 Drawing Figures

GRAPHIC RECORDING SYSTEM

This is a continuation of Ser. No. 514,625 filed July 18, 1983 now abandoned.

BACKGROUND OF THE INVENTION

1. Field of the Invention

Graphic recorders are known to the prior art. Typically, such recorders employ a pen or other similar recording element which is movable relative to a moving recording medium, the combined movement of the recording element and medium being controlled to produce a desired representation. The use of multiple pens for such purposes as multi-color plotting is known to the prior art.

2. Description of the Prior Art

An example of a multiple pen system is disclosed in U.S. Pat. No. 3,401,401, issued Sept. 10, 1968 to Read, et al, for Multiple Pen Cartridge, which is hereby incorporated by reference. The disclosed Read embodiment employs four pens which may be independently chosen for color selection, for example. However, the selection of each pen requires the operation of a different pen-actuating device. Thus, the movable support for the pens must also support and move an independent actuating device for each pen. The over-all mass of the moving support that results from the use of multiple pens and independent actuating elements has placed a practical limit of four pens on the Read technique.

An attempt to overcome the mass problems of multiple pen graphic recorders is disclosed in U.S. Pat. No. 4,135,245 issued Jan. 16, 1979 to Kemplin, et al for plotter with Automatic Pen-Changer, which is hereby incorporated by reference. The Kemplin system, like similar prior art systems, employs a pen repository, at which multiple pens are maintained, and a single pen recording head. The pen which is desired immediately for recording purposes is retrieved from the repository, after which the recording operation is initiated. When a pen change is desired, the recording operation stops, and the recording head returns the pen it has utilized to the repository, where it also retrieves an alternative pen, according to instructions. While this does reduce the mass of the recording pen by the mass of those pens not used, together with their associated actuating and supporting structures, it increases the recording time by the amount of time necessary to return a previously utilized pen and to retrieve the pen that it is desired to use.

Systems meeting the general description of the two systems described above are in common use. Since such systems are typically numerically controlled, each has qualities which frustrate the capabilities of the control systems. For example, heavier masses require heavier mechanisms for moving that mass, which may lead to difficulties in acceleration speed as well as precision. Greater time requirements (i.e., for pen retrieval, for example) introduce a delay not required by the control system.

An improvement over the systems described above is disclosed in U.S. patent application Ser. No. 410,504, filed on Aug. 23, 1982 by Nicholas for Graphic Recording System, which is commonly owned with the present invention, and which is hereby incorporated by reference. The Nicholas system has a multiple pen capability without the mass required for individual actuating systems for each pen. The multiple pen capability also eliminates the delays introduced by a pen retrieval operation. However, even though a single actuator is employed by Nicholas, that actuator is carried with the moving elements such that its weight must be accommodated. That actuator must be powered, requiring, in a preferred embodiment, an electrical connection with the moving elements. In addition, Nicholas discloses an embodiment which employs two positioning systems which must be controlled.

SUMMARY OF THE INVENTION

The present invention provides a graphic recording system having a multiple pen capability with even greater mass reduction than that attained by Nicholas. Pen actuation is accomplished by an actuator arm which is carried by and rotatable with a rod, the rod being supported for pivotal movement about an axis that is generally parallel to the movement, direction or path of a multi-pen carriage. A detent selectively interlocks the actuator arm and the carriage. Rotation of the rod is controlled by a dual-acting linear motion device such as a solenoid which acts on a rocker arm secured to the rod. In one solenoid position, the actuating arm is in mechanical engagement with a pen and interlocked to the carriage via the detent. In another solenoid position, the detent is out of locking engagement while the actuator arm is not in actuating mechanical engagement with a pen. In an intermediate position, the detent may interlock the actuator arm with the carriage while the actuator arm is out of actuating mechanical engagement with a pen to allow common movement of the actuating arm and carriage without a recording operation. The detent may be formed by slots within the carriage and a key commonly carried with the actuator arm into and out of a slot on the carriage.

DETAILED DESCRIPTION OF THE PREFERRED EMBODIMENTS

Figure 1:
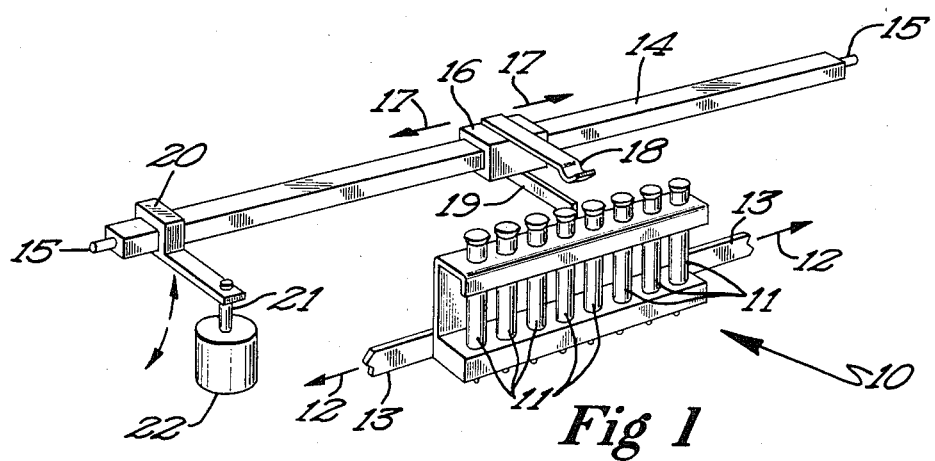
FIG. 1 illustrates the interaction of the components forming a preferred embodiment of the present invention.

Referring now to FIG. 1, there is shown a pen carriage 10 having multiple pens designated 11. The pen carriage 10 may be supported in any convenient manner for movement in two directions along a path, as indicated by the arrows at 12. Typically, the medium on which it is desired to record is movable under the pen carriage in a direction perpendicular to the arrows 12, in known manner. Motion may be imparted to the carriage 10 via a band 13 which may be controlled in known manner.

A rod 14 has its longitudinal axis generally parallel to the path direction indicated by arrows 12 and is supported at its ends 15 independently of the carriage 10 for rotation about its longitudinal axis. A block 16 is carried by the rod 14 and is movable in both directions along its longitudinal axis, as indicated by the arrows 17.

In the illustrated embodiment, the rod 14 has a square cross-section and engages block 16 such that rotation of the rod 14 imparts a rotational force and movement to the block 16. Of course, other rod cross-sections and engagements with the block 16 which allow movement of the block 16 along the longitudinal axis of the rod while imparting a rotational force to the block on rotation of the rod may be employed.

An actuator arm 18 is carried by the block 16 and extends over the pens 11 of carriage 10 such that rotation of the rod 14 and block 16 will cause the actuator arm 18 to engage and depress one of the pens 11 to actuate that pen for recording on the desired medium. A key 19 is also carried by the block 16 and will be discussed more fully below.

A rocker arm 20 is secured to the rod 14 and extends to the output shaft 21 of a linear motion-imparting device 22. In a preferred embodiment, the linear motion device 22 is a dual action solenoid having extended, retracted and neutral positions of its shaft 21. The connection between the shaft 21 and rocker arm 20 may be of any convenient design known to the art.

Figure 2:
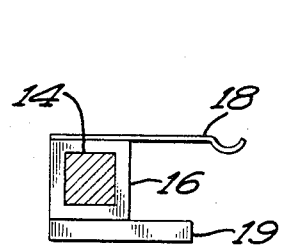
FIG. 2 illustrates a side view of a portion of the embodiment of FIG. 1.

As is apparent from FIG. 1, extension of the shaft 21 induces a rotation of rod 14 and actuator arm 18 to a position where the arm 18 is out of engagement with any of the pens 11 of carriage 10. Retraction of the shaft 21 induces the rotation of rod 14 and actuator arm 18 such that one of the pens 11 of carriage 10 may be engaged by the arm 18 to depress that pen and urge it into contact with a medium under the carriage 10 . . . . The cooperation between rod 14 and block 16, as well as construction of the actuator arm 18 and key 19, is illustrated in side view in FIG. 2.

Figure 3:
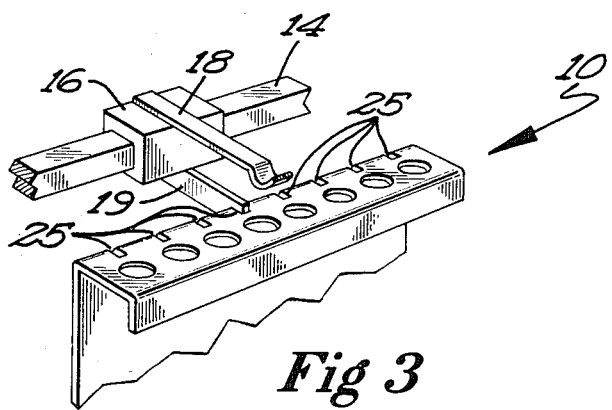
FIG. 3 illustrates a portion of the embodiment of FIG. 1 with the pens removed for greater clarity.

FIG. 3 is a view of a portion of the embodiment illustrated in FIG. 1 with the pens removed to better illustrate the function of the key 19. The carriage 10 is provided with a plurality of slots 25, one slot per pen in the illustrated embodiment. On rotation of the rod 14 and the block 16, the key 19 may move into and out of any of the slots 25 with which it is registered. When the key 19 is within one of the slots 25, it acts as a detent to interlock the carriage 10 with the block 16. When interlocked, movement induced in the carriage 10 will cause the block 16 and, accordingly, the actuator arm 18 to move with the carriage 10. The slots 25, key 19 and actuator arm 18 are positioned relative to each other such that the positioning of a key 19 within one of slots 25 will position the actuator arm 18 over a pen 11 carried by a carriage 10.

Figure 4:
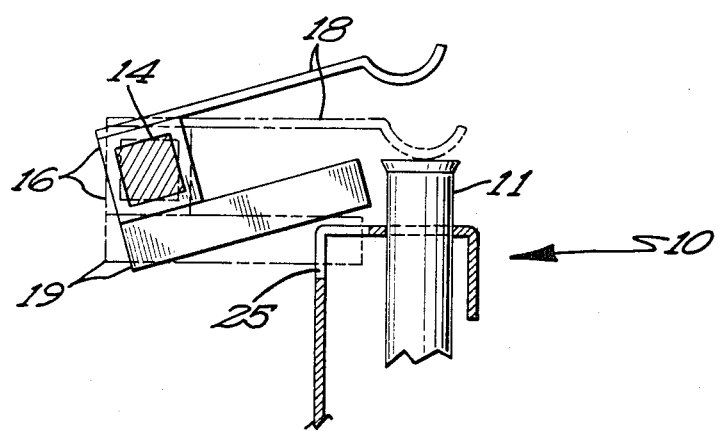
FIG. 4 illustrates the cooperation between that portion of the invention illustrated in FIG. 2 and the pen carriage of FIGS. 1 and 3 and the pens illustrated in FIG. 1.

FIG. 4 illustrates the cooperation between the key 19 and the slots 25 and is a cross-section through any of the slots 25 as seen in FIG. 3 with a pen 11 in position. The solid representation of block 16, actuator arm 18 and key 19 is that position that those elements will assume when the shaft 21 is in its extended position (see FIG. 1). The neutral position of shaft 21 results in a positioning of the key 19 within a slot 25 with which it is in registration and a positioning of the actuator arm 18 over the associated pen 11. In this neutral position, shown in phantom in FIG. 4, movement of the carriage 10 will result in a corresponding movement of the block 16 through the interlock resulting from the position of the key 19 within a slot 25. Thus, the carriage 10 and actuator arm 18 may be moved relative to the recording medium without recording thereon. The retraction of the shaft 21 from the neutral position will result in engagement of actuator arm 18 with its associated pen 11, a depression of that pen, and a recording on the medium on movement of either the medium or the carriage, or both.

Obviously, many modifications and variations of the present invention are possible in light of the above teachings. For example, more than one key 19 may be employed on the block 16 to engage multiple slots 25 associated with the pens 11. Other detent systems may also be employed. Further, while the present invention provides actuation of a recording element by mechanical engagement, other types of mechanical engagement may be employed within the scope of the present invention. A dual-acting hydraulic cylinder may be substituted for the solenoid 22 while, as discussed above, other cross-sections for the rod 14 may be employed.

What the present invention provides is a selective activation of one of a plurality of recording elements with the activating system being supported independently of the carriage for those recording elements. It is therefore to be understood that, within the scope of the appended claims, the invention may be practiced otherwise than as specifically described.

What is claimed is:

1. In a graphic recording system of the type wherein a plurality of recording elements are carried by a carriage, the carriage being movable along a path relative to a recording medium, and having means for selectively actuating said recording elements, by mechanical engagement, for recording on said medium, the improvement wherein said actuating means comprises:

rod means having a longitudinal axis supported for rotation about said axis;

actuator means carried by said rod means independently of said carriage for rotation with said rod means into and out of engagement with said recording elements while being movable along said rod means; and detent means selectively interlocking said actuator means and said carriage in predetermined relative positions for common movement of the actuator means and carriage only when the actuator means and carriage are interlocked.

2. The graphic recording system of claim 1 wherein said detent means comprises a plurality of slot means in said carriage in predetermined relationships with said recording elements and key means carried by and rotatable with said actuator means into and out of said slot means.

3. The graphic recording system of claim 1 wherein said actuating means further comprises means supported independently of said carriage and actuator means for establishing the rotational orientation of said rod means.

4. The graphic recording system of claim 1 wherein said actuating means comprises means supported independently of said carriage and actuator means for selectively rotating said rod means between first and second angular orientations.

5. The graphic recording system of claim 4 wherein said detent means comprises a plurality of slot means in said carriage in predetermined relationships with said recording elements and key means carried by and rotatable with said actuator means into and out of said slot means.

6. The graphic recording system of claim 5 wherein a recording element is mechanically engaged for actuation by said actuator means in said rod means first angular orientation and no recording element is mechanically engaged for actuation by said actuator means in said rod means second angular orientation, said key means being in said slot means in said rod means first angular orientation and out of said slot means in said rod means second angular orientation.

7. The graphic recording system of claim 6 wherein said means for selectively rotating said rod means comprises means for selectively rotating said rod means to a rod means third angular orientation intermediate said rod means first and second angular orientations, said key means being in said slot means with no recording element engaged for actuation by said actuator means in said rod means third angular orientation.

8. The graphic recording system of claim 7 wherein said actuator means comprises actuator arm means mechanically engageable with said recording elements.

9. The graphic recording system of claim 8 wherein said means for selectively rotating said rod means comprises rocker arm means secured to said rod means and dual-action linear motion means having a neutral position operative on said rocker arm means.

10. The graphic recording system of claim 1 wherein said actuator means is moved along said rod means by a force imparted by said detent means.

* * * * *